(12) United States Patent  
Reveman

(10) Patent No.: US 7,996,787 B2  
(45) Date of Patent: Aug. 9, 2011

(54) PLUG-IN ARCHITECTURE FOR WINDOW MANAGEMENT AND DESKTOP COMPOSITING EFFECTS

(75) Inventor: David Reveman, Boston, MA (US)

(73) Assignee: CPTN Holdings LLC, Redmond, WA (US)

( * ) Notice: Subject to any disclaimer, the term of this patent is extended or adjusted under 35 U.S.C. 154(b) by 756 days.

(21) Appl. No.: 11/702,646

(22) Filed: Feb. 6, 2007

(65) Prior Publication Data

US 2008/0189651 A1 Aug. 7, 2008

(51) Int. Cl.
*G06F 3/048* (2006.01)

(52) U.S. Cl. .................. 715/788; 715/781; 715/782

(58) Field of Classification Search .................. 715/748, 715/788, 781, 782, 799, 800, 808, 809, 810; 345/837, 726, 835, 845, 578, 719, 722, 723, 345/769, 771, 810, 846, 853; 348/571, 575, 348/578, 584, 598
See application file for complete search history.

(56) References Cited

U.S. PATENT DOCUMENTS

| | | | | |
|---|---|---|---|---|
| 5,534,887 A | | 7/1996 | Bates et al. | 345/120 |
| 5,771,042 A | | 6/1998 | Santos-Gomez | 345/342 |
| 5,898,432 A | | 4/1999 | Pinard | 345/334 |
| 5,903,728 A | * | 5/1999 | Semenzato | 709/217 |
| 6,006,279 A | * | 12/1999 | Hayes | 719/328 |
| 6,148,336 A | * | 11/2000 | Thomas et al. | 709/224 |
| 6,167,404 A | * | 12/2000 | Morcos et al. | 707/102 |
| 6,275,234 B1 | * | 8/2001 | Iwaki | 345/428 |
| 6,317,142 B1 | * | 11/2001 | Decoste et al. | 715/762 |
| 6,469,723 B1 | * | 10/2002 | Gould et al. | 715/837 |
| 6,546,263 B1 | | 4/2003 | Petty et al. | 455/566 |
| 6,564,201 B1 | | 5/2003 | Hamsa | |
| 6,603,476 B1 | | 8/2003 | Paolini et al. | |
| 6,621,508 B1 | | 9/2003 | Shiraishi et al. | 345/810 |
| 6,734,873 B1 | * | 5/2004 | Herf et al. | 345/629 |
| 6,742,176 B1 | * | 5/2004 | Million et al. | 717/120 |
| 6,782,531 B2 | * | 8/2004 | Young | 717/130 |
| 6,842,856 B2 | * | 1/2005 | Shenassa et al. | 713/1 |
| 7,013,435 B2 | | 3/2006 | Gallo et al. | 715/850 |
| 7,019,752 B1 | | 3/2006 | Paquette et al. | |
| 7,051,284 B2 | | 5/2006 | Uemura et al. | 715/752 |
| 7,091,984 B1 | | 8/2006 | Clark | |
| 7,254,814 B1 | * | 8/2007 | Cormier et al. | 718/106 |
| 7,391,422 B1 | * | 6/2008 | Guinan et al. | 345/581 |
| 7,559,034 B1 | * | 7/2009 | Paperny et al. | 715/803 |
| 2003/0079052 A1 | * | 4/2003 | Kushnirskiy | 709/328 |

(Continued)

OTHER PUBLICATIONS

Novell, Press Release—Novell Raises the Bar for Linux Desktop, 2 pages, (Feb. 7, 2006).

*Primary Examiner* — Weilun Lo
*Assistant Examiner* — Rashedul Hassan
(74) *Attorney, Agent, or Firm* — Pillsbury Winthrop Shaw Pittman LLP

(57) ABSTRACT

A system and method that relates to a plug-in architecture that enables accelerated rendering and compositing of one or more graphical effects instantiated by one or more separate visual effect plug-ins. The plug-in architecture enables setting up visual effects, accepting graphical output requests, customizing visual effects, and/or allowing enhanced graphics rendering for desktop usage, among other things. The invention provides a modular approach to customizing and rendering visual effects. The plug-in architecture enables plug-ins to be exchanged, modified, removed, and added, among other things.

24 Claims, 3 Drawing Sheets

U.S. PATENT DOCUMENTS

| | | | |
|---|---|---|---|
| 2004/0051739 A1 | 3/2004 | Schmickley et al. | 345/772 |
| 2004/0261038 A1* | 12/2004 | Ording et al. | 715/792 |
| 2004/0267940 A1* | 12/2004 | Dideriksen et al. | 709/228 |
| 2005/0027858 A1 | 2/2005 | Sloth et al. | 709/224 |
| 2005/0091254 A1 | 4/2005 | Stabb et al. | 707/102 |
| 2005/0229104 A1* | 10/2005 | Franco et al. | 715/743 |
| 2005/0246163 A1* | 11/2005 | Ono et al. | 704/200 |
| 2006/0085758 A1 | 4/2006 | Backus | 715/772 |
| 2006/0182411 A1* | 8/2006 | Loo | 386/52 |
| 2006/0248469 A1 | 11/2006 | Czerwinski et al. | 715/764 |
| 2007/0005734 A1* | 1/2007 | Abdo | 709/219 |
| 2007/0006093 A1* | 1/2007 | Day et al. | 715/781 |
| 2007/0044085 A1* | 2/2007 | Stamper et al. | 717/168 |
| 2007/0061733 A1* | 3/2007 | Schechter et al. | 715/740 |
| 2008/0057960 A1 | 3/2008 | Lahtiranta et al. | 455/435.2 |

* cited by examiner

PLUG-IN ARCHITECTURE FOR WINDOW MANAGEMENT AND DESKTOP COMPOSITING EFFECTS

FIELD OF THE INVENTION

The invention relates to rendering and compositing visual effects for desktop display using a customizable plug-in architecture that enhances user's/developer's functions, customizations and usability of the desktop.

BACKGROUND

Graphics cards are hardware cards that can be used with a computer to generate and display output images. Graphics cards with more advanced features and capabilities such as 3D acceleration are currently being developed and sold. A graphics card with 3D acceleration provides substantial resource savings from having to render 3D graphics using processor resources only. A 3D accelerator allows programs (e.g., games where the screen image must be recomputed many times per second) to display virtual 3D objects with a greater level of detail and color. With hardware 3D acceleration, three-dimensional rendering uses the graphics processor on the graphics card instead of taking up valuable CPU resources for drawing 3D images. Advancement in graphics cards allows for further development in user interfaces and in the way users interact with their computer display.

At present there are no solutions that effectively provide users enhanced 3D desktop graphics that may promote usability and are customizable and easily extendable.

SUMMARY

One aspect of the invention relates to a plug-in architecture that enables accelerated rendering and compositing of one or more graphical effects instantiated by one or more separate visual effect plug-ins. The plug-in architecture enables setting up visual effects, accepting graphical output requests, customizing visual effects, and/or allowing enhanced graphics rendering for desktop usage, among other things. The invention provides a modular approach to customizing and rendering visual effects. The plug-in architecture enables plug-ins to be exchanged, modified, removed, and added, among other things.

The plug-in architecture also allows individual visual effect plug-ins to be implemented and managed independently. For example, one plug-in does not have to be aware of any other plug-ins, nor does it have to require the function of another plug-in. Another aspect of the invention enables one or more of the plug-ins to be grouped together to combine various desktop visual effects (e.g., cube, rotate, etc). One advantage to using the plug-in architecture is that it allows the collection of visual effect plug-ins to share graphics hardware resources (e.g., graphics card).

In one or more embodiments a system may include a computing device, one or more input/output devices, a desktop manager, plug-in architecture, one or more applications, a graphics card, an event handler, and/or an configuration editor interface (see FIG. 1). The desktop manager may use the external plug-in architecture, which stores a plurality of visual effect plug-ins, for loading and compositing the one or more respective visual effects. An added advantage to implementing an external plug-in architecture is that it provides third party developers an open platform from which they may easily add their own visual effect plug-ins.

The desktop manager may include at least a window manager and compositing manager that implements all (or some) of the visual effect plug-ins associated with the plug-in architecture. The composite manager and/or window manager may provide visual effects instructions to the graphics card. Together with the 3D accelerator enabled graphics card, the system (e.g., desktop manager, plug-in architecture, graphics card, etc.) may be used to composite desktop effects quickly and efficiently.

The compositing manager (or other mechanism) may be used to combine one or more visual effects (from the plug-ins) with a currently selected window to render graphical output. A window manager may allow the manipulation of application windows and/or dialog windows presented on a desktop. The compositing manager and window manager may be implemented at a single location or at separate locations, respectively. The compositing manager may be configured to issue visual effects instructions to a graphics card according to one or more of the effect plug-ins.

As discussed, visual effects may be implemented by the desktop manager (e.g., the window manager and compositing manager) using the plug-in architecture. Any number of effect plug-ins may be used (including zero). The plug-ins may be stored and managed as dynamically linked libraries in a directory. Configuration data for the each plug-in may be stored in a registry (e.g., Gconf). The registry may be organized in a hierarchy (like registry in Windows). Using a configuration interface, user's can access and modify settings related to each plug-in. For example, the function-key bindings for the various compositing operations, the speed of the effects, among other things, may be customized.

The plug-in architecture also allows individual plug-ins to be removed without affecting operations of any other plug-ins. Although each plug-in is managed independently, one or more plug-ins may be grouped to be dependent on another plug-in. For example, if a cube plug-in is turned on, then a rotate plug-in may be helpful to manipulate the cube interface. Thus, plug-ins may be grouped together to form dependences when desired.

In general, the plug-in architecture provides a highly customizable open architecture that provides desktop effects to users. Broadly, any number of effect plug-ins may be used to composite window effects including but not limited to, decoration, fade, wobble, minimize, cube, rotate, zoom, scale, move, resize, place, and switcher, among other effects. One or more effect plug-ins may be supplied from third party developers.

The system and method of the invention also allows multiple effects to share graphics hardware resources. The nature of the plug-in architecture allows user/developers to stack any of their own plug-ins to existing and/or created plug-ins. One or more effects may be stacked in order to create a pipeline of effects to fully customize effects. The invention also provides a way to add new effects and functionality to the desktop in a more frequent and reliable way thus making it possible to keep up with how fast the graphics hardware industry is evolving.

DETAILED DESCRIPTION

One aspect of the invention includes a plug-in architecture 18 that provides visual effects information for compositing and rendering desktop effects for output. The plug-in architecture enables setting up visual effects, accepting graphical output requests, customizing visual effects, and/or allowing enhanced graphics rendering for desktop usage, among other things. The invention provides a modular approach to customizing and rendering visual effects. The plug-in architecture 18 enables plug-ins to be exchanged, modified, removed, and added, among other things.

Figure 1:
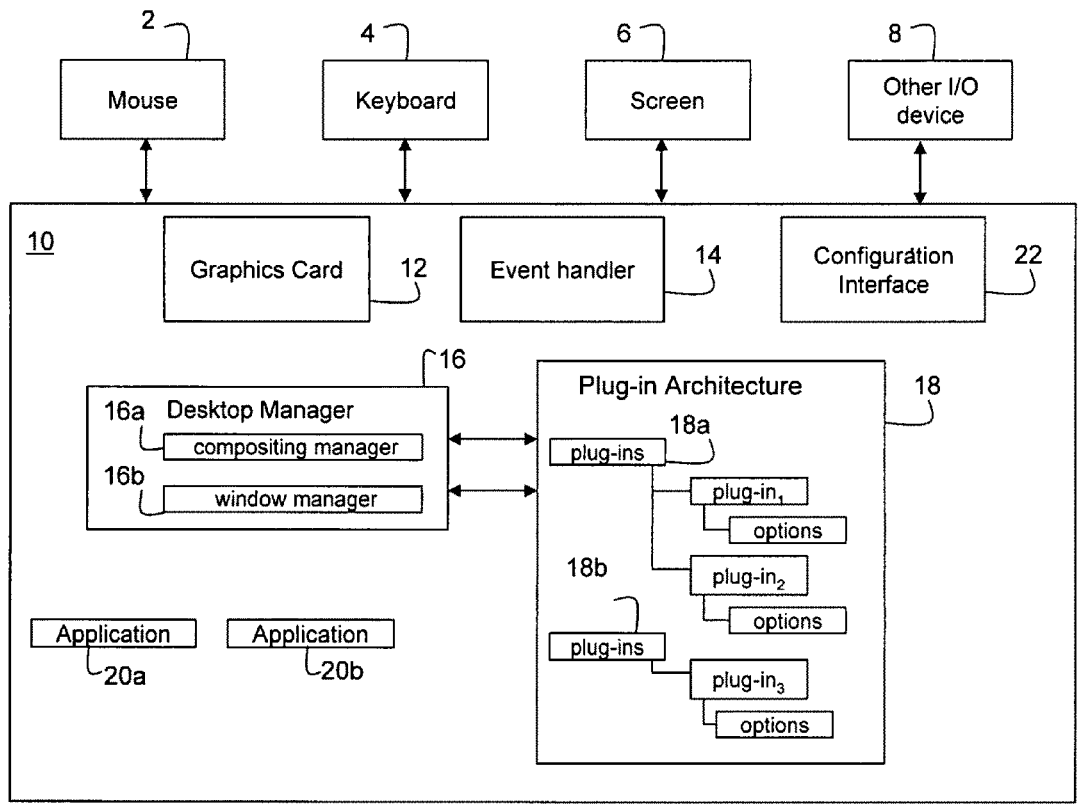
FIG. 1 illustrates a high-level block diagram for a system, according to an embodiment of the invention.

FIG. 1 illustrates a high-level block diagram for a computing system, according to an embodiment of the invention. In one or more embodiments, the system of the invention may include, among other things, a computing device 10 (e.g., PC, client computer, etc.), one or more input/output devices (2, 4, 6, 8), a graphics card 12, an event handler 14, a desktop manager 16, a plug-in architecture 18, one or more applications (20a, 20b), and/or a configuration interface 22. The elements of FIG. 1 may be interconnected using commonly known hardware and/or software techniques within a computer system to enable communication between the one or more components.

In some embodiments the plug-in architecture 18 may include one or more visual effect plug-ins (18a, 18b). The plug-in architecture 18 may be an external component that effectively provides a modular architecture for implementing a plurality of effect plug-ins. The plug-in architecture also allows a plurality of plug-ins to share graphics hardware resources (e.g., desktop manager 16, graphics card 12).

One or more effect plug-ins may be supplied from third party developers in order to expand the number and/or functionality of visual effect plug-ins that may be implemented on the system. Examples of effect plug-ins include, but are in no way limited to, decoration, fade, wobble, minimize, cube, rotate, zoom, scale, move, resize, place, and/or switcher.

The plug-ins may be stored and managed as dynamically linked libraries in a directory. Configuration data for each plug-in may be stored in a registry (e.g., Gconf). The registry may be organized in a hierarchy (as shown in FIG. 1). As shown in FIG. 1, each plug-in (e.g., plug-in1, plug-in2, plug-in3 may have configuration options that may be customized. And one or more plug-ins may be grouped based on source, type, and/or other grouping configuration. The plug-in architecture also enables each plug-in to be managed independently of one another. Individual plug-ins may be removed, added, and/or modified without effecting operations of other plug-ins. For example, one plug-in may operate irrespective of another plug-in, thus it may not require the functions of any another plug-in(s).

The plug-in architecture 18 may provide the desktop manager 16 with information regarding the one or more effect plug-ins to composite and render. In some embodiments, the desktop manager 16 may include a compositing manager 16a and a window manager 16b (and/or some other mechanism (s)). The compositing manager 16a can composite windows with visual effects based on one or more effect plug-ins instantiated from the external plug-in architecture 18. The compositing manager 16a may be used to combine one or more visual effects (e.g., plug-ins) together to display windows. This system effectively allows plug-ins to be managed and rendered at separate locations such as the plug-in architecture 18 and desktop manager 16, respectively.

The window manager 16b may execute in combination with the compositing manager 16a. The window manager 16b may allow manipulation of application windows and/or dialog windows presented on a desktop display. Both the window manager 16b and the compositing manager 16a may be configured to achieve graphical effects according to the one or more effect plug-ins (18a, 18b). The compositing manager 16a may issue visual effects instruction to a graphics card 12 according to the one or more effect plug-ins (18a, 18b). Thus, together with a 3D accelerator enabled graphics card 12, the system (e.g., desktop manager 16, plug-in architecture 18, graphics card 12, etc.) may be used to composite desktop effects quickly and efficiently.

The event handler 14 may be implemented to receive and process event information, among other things. The event handler 14 may be executed as part of the desktop manager 16 or implemented separately (as shown). In either implementation the event handler 14 may detect events occurring on the computer system 10 (or associated with the computer system) to determine whether the detected event(s) trigger a visual effect plug-in.

In some examples, event information may be based on input received from one or more input devices (e.g., mouse, keyboard, touch screen, and/or any other input device). In another example, event information may be application initiated events including, but not limited to the creation of an application window and/or closing an application window. Other event examples may exist.

Events may be used to trigger one or more plug-in effects stored at the plug-in architecture 18. For example, a zoom effect plug-in may be triggered based on the user pressing the "Ctrl" and "+" keys at the same time. In another example, as windows appear and disappear a fade-in/fade-out effect may be rendered.

The configuration interface 22 may be used to pre-configure individual plug-ins to be associated with the occurrence of one or more events. Thus, the detection of a corresponding event(s) can trigger a visual effect plug-in to be instantiated by the event handler 14 and then composited by the compositing manager 16a. The configuration interface 24 enables the user to select which plug-ins to enable, customize key bindings (and mouse bindings) associated with effect plug-ins, change aspects of the visual effects, and/or install more effect plug-ins, among other things. Thus, the system provides a manageable visual effects platform that can be customized to user's preferences. This may be particularly beneficial for those requiring certain screen viewing and/or display attributes (e.g., magnified text, multiple desktops, etc.)

The configuration interface 22 may be used to configure event bindings (e.g., key-bindings, mouse bindings, etc.) for each plug-in. For example, the configuration interface 22 may be used to set default and/or customized key bindings and mouse bindings for instantiating visual effects. A key binding may be a set of shortcut keystrokes (e.g., Ctrl+N, Alt+C, etc.).

Figure 2:
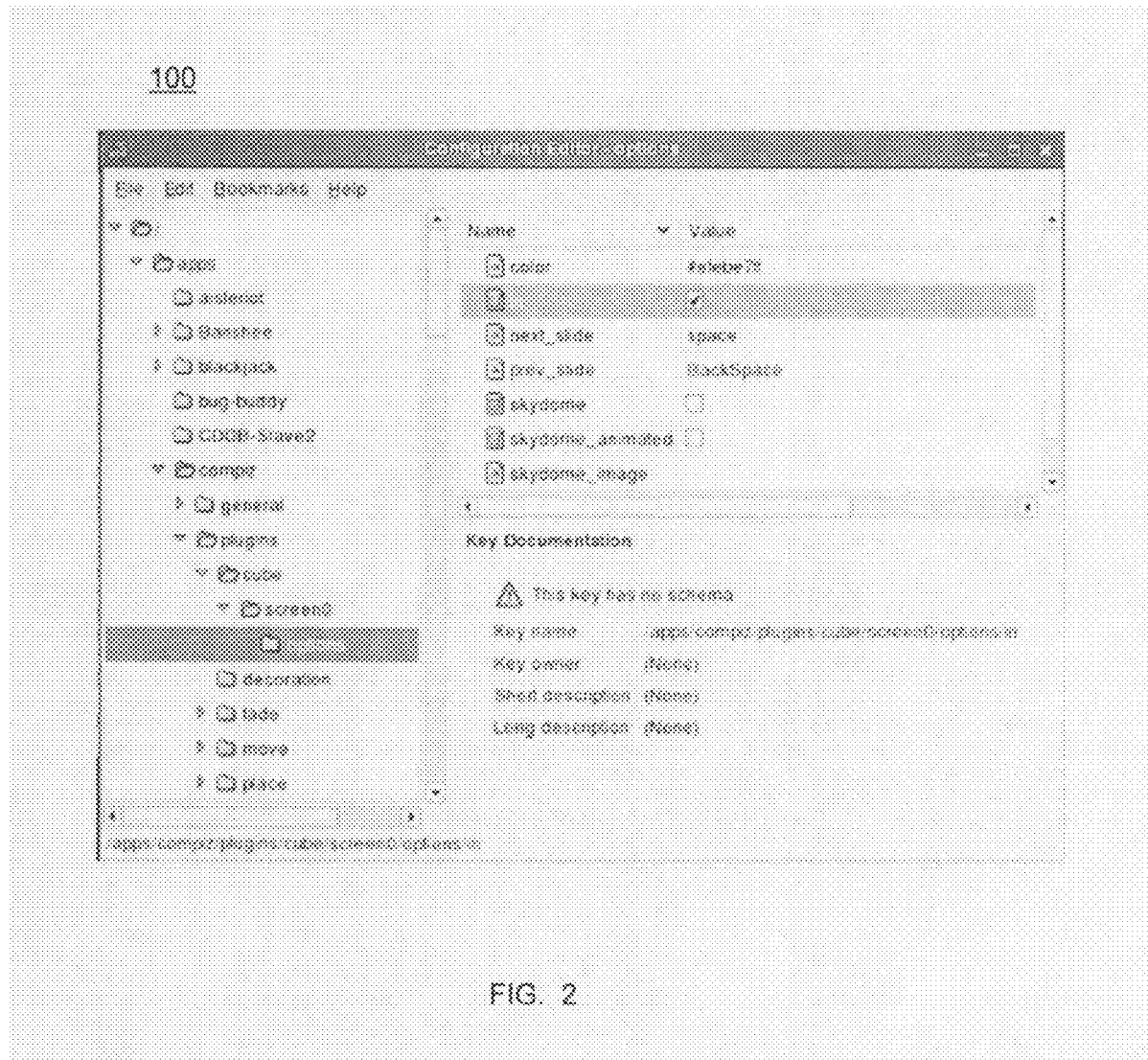
FIG. 2 illustrates an exemplary configuration interface, according to an embodiment of the invention.

The user may also choose to disable and/or enable one or more effect plug-ins. The configuration interface 22 may be further used to configure properties associated with each plug-in effect. For example, properties may include speed of the effect, algorithm used to place windows, opacity of windows while being moved, size of shadows, etc. Any number of effect properties may be configured for a plug-in. Properties may be plug-in specific. FIG. 2 is an exemplary screen shot 100 of a configuration interface 22, according to one embodiment of the invention. The interface itself may be displayed in any number of ways and the illustration in FIG. 2 is not meant to be limiting.

Figure 3:
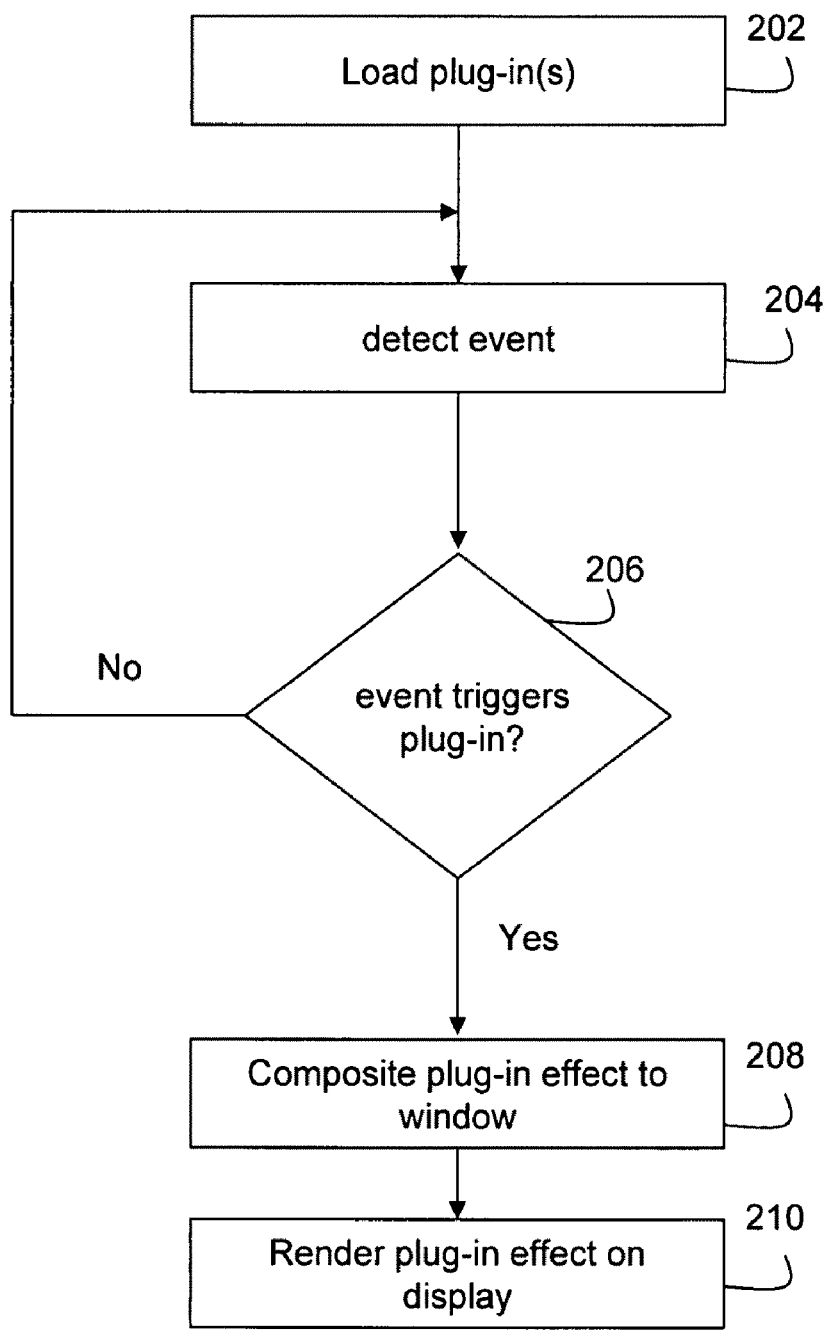
FIG. 3 illustrates a flow diagram for a method related to compositing window effects, according to an embodiment of the invention.

FIG. 3 discloses an exemplary method associated with the foregoing system of the invention. The method may initially load one or more stored effect plug-ins (operation 202). A list of plug-ins may be loaded via command line arguments (and/or other mechanism). Once the desired plug-ins and corresponding configuration information is loaded, the process may proceed to make use of the one or more plug-ins.

Operation 204 detects event information (e.g., keyboard event, mouse event, application event, etc.). Detection of events is followed by a determination whether the event triggered a plug-in (operation 206). If an event does trigger a plug-in then the plug-in effect may be composited on the selected window or object in operation 208. Otherwise the system may go back to operation 204 where it awaits another event. After the corresponding plug-in is composited the actual visual effect may be transmitted for rendering (at the graphics card) to the user's display and/or other output device (operation 210). For example, hardware instructions (or other instructions) may be transmitted to a graphics card to initiate hardware rendering of the composited visual effects.

A further feature of the present invention is the customizability that may be performed for managing and configuring visual effects. Although each plug-in is managed independently, one or more plug-ins may be grouped to be dependent on another plug-in. For example, if a cube plug in is turned on then a rotate plug-in may be helpful to manipulate the cube interface. Thus plug-ins may be grouped together to form dependences when desired.

The subject matter of this application has been described in conjunction with the specific embodiments outlined above, it is evident that many alternatives, modifications and variations will be apparent to those skilled in the art. Accordingly, the preferred embodiments as set forth above are intended to be illustrative, not limiting. Various changes may be made without departing from the spirit and scope of the following claims.

What is claimed is:

1. A system for window management and desktop compositing effects, wherein the system comprises:
   a plug-in architecture storing a plurality of visual effect plug-ins, wherein the plurality of visual effect plug-ins include visual effect instructions for rendering a plurality of visual effects on a desktop;
   a computing device coupled to the plug-in architecture storing the plurality of visual effect plug-ins, wherein the computing device includes a desktop manager configured to:
      display the desktop on a screen coupled to the computing device;
      receive information relating to one or more events detected on the computing device, wherein the one or more events detected on the computing device relate to at least one window presented on the desktop displayed on the screen coupled to the computing device;
      instantiate one or more of the plurality of visual effect plug-ins stored in the plug-in architecture in response to receiving the information relating to the one or more events detected on the computing device, wherein the desktop manager includes one or more pre-configured event bindings that cause the one or more detected events to trigger the one or more instantiated visual effect plug-ins; and
      composite the at least one window presented on the desktop displayed on the screen with one or more of the plurality visual effects that are associated with the one or more instantiated visual effect plug-ins, wherein the desktop manager combines the at least one window and the one or more visual effects associated with the instantiated visual effect plug-ins to composite the at least one window;
   a graphics card configured to receive one or more visual effect instructions associated with the instantiated visual effect plug-ins from the desktop manager, wherein the one or more visual effect instructions cause the graphics card to render the one or more visual effects combined with the composited window on the desktop displayed on the screen coupled to the computing device; and
   a configuration interface coupled to the computing device including the one or more pre-configured event bindings, wherein the configuration interface enables a user to customize the one or more pre-configured event bindings for the one or more instantiated visual effect plug-ins.

2. The system of claim 1, wherein the plurality of visual effects associated with the plurality of visual effect plug-ins comprise one or more of decoration, fade, wobble, minimize, cube, rotate, zoom, scale, move, resize, place, or switcher visual effects.

3. The system of claim 1, wherein the configuration interface further includes one or more properties associated with the one or more instantiated visual effect plug-ins.

4. The system of claim 3, wherein the one or more visual effect instructions further cause the graphics card to render the one or more visual effects with the one or more properties associated with the one or more instantiated visual effect plug-ins.

5. The system of claim 3, wherein the one or more pre-configured event bindings include one or more key bindings, mouse bindings, or application bindings that associate events occurring on the computing device with the plurality of visual effect plug-ins stored in the plug-in architecture.

6. The system of claim 3, wherein the one or more properties associated with the one or more instantiated visual effect plug-ins further cause the graphics card to configure a speed for the rendered visual effects, a placement for the composited window on the desktop, an opacity for the composited window while the composited window moves on the desktop, or a shadow size for the composited window on the desktop.

7. The system of claim 1, wherein the configuration interface enables adding new visual effect plug-ins to plurality of visual effect plug-ins in the plug-in architecture, deleting one or more of the plurality of visual effect plug-ins from the plug-in architecture, and editing the plurality of visual effect plugs-ins in the plug-in architecture.

8. The system of claim 1, wherein one or more of the plurality of visual effect plug-ins stored in the plug-in architecture are provided by a third party.

9. The system of claim 1, wherein the graphics card includes a 3D accelerator that renders the one or more visual effects combined with the composited window.

10. The system of claim 1, wherein the one or more visual effect instructions include hardware instructions that further cause the graphics card to hardware render the one or more visual effects combined with the composited window.

11. The system of claim 1, wherein the desktop manager is further configured to identify at least one of the plurality of visual effects plug-ins stored in the plug-in architecture that depends on one or more of the instantiated visual effect plug-ins, wherein the desktop manager further combines the at least one window with one or more of the plurality of visual effects that are associated with the identified visual effect plug-in that depends on one or more of the instantiated visual effect plug-ins to composite the at least one window.

12. The system of claim 11, wherein the one or more visual effects associated with the instantiated visual effect plug-ins include a cube visual effect and the one or more visual effects associated with the identified visual effect plug-in include a rotate visual effect for manipulating the cube visual effect.

13. A method for window management and desktop compositing effects, comprising:

storing a plurality of visual effect plug-ins in a plug-in architecture coupled to a computing device, wherein the plurality of visual effect plug-ins include visual effect instructions for rendering a plurality of visual effects on a desktop;

displaying the desktop on a screen coupled to the computing device;

receiving information relating to one or more events detected on the computing device, wherein the one or more events detected on the computing device relate to at least one window presented on the desktop displayed on the screen coupled to the computing device;

instantiating one or more of the plurality of visual effect plug-ins stored in the plug-in architecture in response to receiving the information relating to the one or more events detected on the computing device, wherein one or more pre-configured event bindings cause the one or more detected events to trigger one or more instantiated visual effect plug-ins;

compositing the at least one window presented on the desktop displayed on the screen with one or more of the plurality visual effects that are associated with the one or more instantiated visual effect plug-ins, wherein compositing the at least one window includes combining the at least one window and the one or more visual effects associated with the instantiated visual effect plug-ins; and transmitting one or more visual effect instructions associated with the instantiated visual effect plug-ins to a graphics card coupled to the computing device, wherein the one or more visual effect instructions cause the graphics card to render the one or more visual effects combined with the composited window on the desktop displayed on the screen coupled to the computing device;

wherein a configuration interface coupled to the computing device includes the one or more pre-configured event bindings that enable a user to customize the one or more pre-configured event bindings for the one or more instantiated visual effect plug-ins.

14. The method of claim 13, wherein the plurality of visual effects associated with the plurality of visual effect plug-ins comprise one or more of decoration, fade, wobble, minimize, cube, rotate, zoom, scale, move, resize, place, or switcher visual effects.

15. The method of claim 13, wherein the configuration interface further includes one or more properties associated with the one or more instantiated visual effect plug-ins.

16. The method of claim 15, wherein the one or more visual effect instructions further cause the graphics card to render the one or more visual effects with the one or more properties associated with the one or more instantiated visual effect plug-ins.

17. The method of claim 15, wherein the one or more pre-configured event bindings include one or more key bindings, mouse bindings, or application bindings that associate events occurring on the computing device with the plurality of visual effect plug-ins stored in the plug-in architecture.

18. The method of claim 15, wherein the one or more properties associated with the one or more instantiated visual effect plug-ins further cause the graphics card to configure a speed for the rendered visual effects, a placement for the composited window on the desktop, an opacity for the composited window while the composited window moves on the desktop, or a shadow size for the composited window on the desktop.

19. The method of claim 13, wherein the configuration interface enables adding new visual effect plug-ins to plurality of visual effect plug-ins in the plug-in architecture, deleting one or more of the plurality of visual effect plug-ins from the plug-in architecture, and editing the plurality of visual effect plugs-ins in the plug-in architecture.

20. The method of claim 13, wherein one or more of the plurality of visual effect plug-ins stored in the plug-in architecture are provided by a third party.

21. The method of claim 13, wherein the graphics card includes a 3D accelerator that renders the one or more visual effects combined with the composited window.

22. The method of claim 13, wherein the one or more visual effect instructions include hardware instructions that further cause the graphics card to hardware render the one or more visual effects combined with the composited window.

23. The method of claim 13, further comprising identifying at least one of the plurality of visual effects plug-ins stored in the plug-in architecture that depends on one or more of the instantiated visual effect plug-ins, wherein compositing the at least one window further includes combining the at least one window and one or more of the plurality of visual effects that are associated with the identified visual effect plug-in that depends on one or more of the instantiated visual effect plug-ins.

24. The method of claim 23, wherein the one or more visual effects associated with the instantiated visual effect plug-ins include a cube visual effect and the one or more visual effects associated with the identified visual effect plug-in include a rotate visual effect for manipulating the cube visual effect.

* * * * *